(12) United States Patent
Geserich et al.

(10) Patent No.: US 9,778,094 B2
(45) Date of Patent: Oct. 3, 2017

(54) DYNAMIC SCALE WITH MULTIPLE WEIGHING PANS

(71) Applicants: Frank Geserich, Friedrichsthal (DE); Stefan Beckmann, Falkensee (DE); Andreas Blume, Oranienburg (DE); Karsten van der Waydbrink, Potsdam (DE)

(72) Inventors: Frank Geserich, Friedrichsthal (DE); Stefan Beckmann, Falkensee (DE); Andreas Blume, Oranienburg (DE); Karsten van der Waydbrink, Potsdam (DE)

(73) Assignee: Francotyp-Postalia GmbH, Berlin (DE)

(*) Notice: Subject to any disclaimer, the term of this patent is extended or adjusted under 35 U.S.C. 154(b) by 112 days.

(21) Appl. No.: 14/733,189

(22) Filed: Jun. 8, 2015

(65) Prior Publication Data
US 2016/0018251 A1    Jan. 21, 2016

(30) Foreign Application Priority Data

Jun. 16, 2014 (DE) .................... 20 2014 004 821 U
Mar. 30, 2015 (DE) .................... 20 2015 002 361 U

(51) Int. Cl.
| | |
|---|---|
| *G01G 19/414* | (2006.01) |
| *G01G 11/00* | (2006.01) |
| *G01G 21/22* | (2006.01) |
| *G01G 21/23* | (2006.01) |
| *G01G 23/12* | (2006.01) |
| *G01G 19/00* | (2006.01) |
| *G01G 23/06* | (2006.01) |

(52) U.S. Cl.
CPC ......... *G01G 19/005* (2013.01); *G01G 11/003* (2013.01); *G01G 21/22* (2013.01); *G01G 23/06* (2013.01); *G01G 23/12* (2013.01)

(58) Field of Classification Search
CPC .... G01G 11/003; G01G 19/005; G01G 21/22; G01G 21/23; G01G 23/06; G01G 23/12; G01G 3/1414
See application file for complete search history.

(56) References Cited

U.S. PATENT DOCUMENTS

| | | | | |
|---|---|---|---|---|
| 4,437,561 A | * | 3/1984 | Hasegawa ............ | G01G 11/003 177/145 |
| 4,709,770 A | * | 12/1987 | Kohashi ............... | G01G 3/1414 177/185 |
| 4,711,314 A | * | 12/1987 | Suzuki .................. | G01G 21/00 177/164 |

(Continued)

FOREIGN PATENT DOCUMENTS

EP    0 974 819 A2    1/2000

*Primary Examiner* — Randy Gibson
(74) *Attorney, Agent, or Firm* — Schiff Hardin LLP

(57) ABSTRACT

A dynamic scale to achieves a higher throughput, by at least one of a spring steel sheet being installed in the travel direction of the first shaft of the first transport belt, and/or the control of the motors as well as the transmission of the sensor signals taking place via ribbon cables which are arranged parallel to the transport belts, and/or an electronic evaluation of interference oscillations of the signals of the sensors of the weighing cell takes place, within at least one lowpass filter being used, and wherein at least two digital notch filters are used.

15 Claims, 12 Drawing Sheets

(56) References Cited

U.S. PATENT DOCUMENTS

| | | | | |
|---|---|---|---|---|
| 4,779,016 A * | 10/1988 | Sugiyama | H03K 19/09448 | 326/66 |
| 4,814,995 A * | 3/1989 | Daniels, Jr. | G01G 19/005 | 177/25.13 |
| 4,815,547 A * | 3/1989 | Dillon | G01G 3/18 | 177/211 |
| 4,817,026 A * | 3/1989 | Inoue | G01G 23/06 | 177/185 |
| 5,072,799 A * | 12/1991 | Freeman | G01G 23/005 | 177/154 |
| 5,130,938 A * | 7/1992 | Inoue | G01G 3/147 | 177/185 |
| 5,190,117 A * | 3/1993 | Freeman | G01G 23/005 | 177/211 |
| 5,291,422 A * | 3/1994 | Esztergar | G01V 5/0033 | 177/1 |
| 5,623,128 A * | 4/1997 | Grimm | G01G 3/1406 | 177/211 |
| 5,635,679 A * | 6/1997 | Kohashi | G01G 19/035 | 177/1 |
| 5,856,637 A * | 1/1999 | Vande Berg | G01G 19/18 | 177/145 |
| 5,990,422 A * | 11/1999 | Komori | G01G 19/035 | 177/119 |
| 6,265,675 B1 * | 7/2001 | Hubler | G01G 19/005 | 177/145 |
| 6,433,288 B1 * | 8/2002 | Olafsson | G01G 11/046 | 177/145 |
| 6,713,689 B2 * | 3/2004 | Eaton | G01G 19/4148 | 177/185 |
| 6,820,873 B2 * | 11/2004 | Kulpa | B65H 5/025 | 271/273 |
| 7,279,645 B1 * | 10/2007 | Inglin | G01G 11/046 | 177/145 |
| 7,687,727 B2 * | 3/2010 | Turner | G01G 19/005 | 177/1 |
| 8,134,090 B2 * | 3/2012 | Duppre | G01G 11/043 | 177/119 |
| 8,148,650 B2 * | 4/2012 | Sye | G01G 19/002 | 177/145 |
| 8,178,796 B2 * | 5/2012 | Allen | G01G 19/002 | 177/145 |
| 8,969,743 B2 | 3/2015 | Huebler et al. | | |
| 2009/0008859 A1 | 1/2009 | Fairweather et al. | | |

* cited by examiner

DYNAMIC SCALE WITH MULTIPLE WEIGHING PANS

BACKGROUND OF THE INVENTION

Field of the Invention

The present invention concerns a dynamic scale of the type having multiple weighing pans.

Description of the Prior Art

Dynamic scales, in particular for the automatic processing of mail pieces (letters, for example), are known from the prior art (see for example EP 974819 B1 and EP 2520911 A1).

For practical operation of a dynamic scale according to EP974819, it has been shown that the throughput of mail pieces—in particular mixed mail of the sizes DIN C6 to DIN B4—is limited. In continuous operation, an average throughput of 50 mail pieces per minute is achieved for mixed mail. This throughput cannot be further increased without greater errors occurring. A central cause for the limitation of the throughput in the dynamic scale according to EP 974819 are the large letter gaps: since only one mail piece may ever be located on the scale during the weighing, large minimum letter gaps result that limit the total throughput. Therefore, the object exists to significantly improve the throughput of mail pieces given a dynamic scale according to EP 974819 without the error rate being increased. It has been found that, via the inventive measures illustrated in the following, the mail throughput may be increased up to 90 mail pieces per minute given mail pieces having the length of the DIN C6 size or, respectively, up to 110 mail pieces per minute given mail pieces DIN C6 in size, without additional errors occurring in the weighing.

EP 2520911 A1 describes a dynamic scale with a plurality of weighing units (in particular two) with a respective weighing cell and with a weighing pan. FIG. 4 of the cited document shows as an example such an arrangement in which the two weighing pans are formed by two transport belts that travel horizontally at the same level. A first frame for the first weighing plate and a second frame for the second weighing plate as well as a respective adapter for introducing load into the respective associated weighing cell are thereby apparent. According to this illustration, the mail piece to be weighed is transported from left to right across the two transport belts and the associated weighing pans. The transport of the mail good thereby takes place nearly orthogonal (angle of approximately 110° relative to the floor plate) to the longitudinal edge. A corresponding feed device is located upstream from the scale (meaning to the left in the depiction) in terms of the mail flow. An individualization of the mail good is typically made in this feed device, and said mail good is supplied to the scale. The actual franking of the mail good (via a corresponding overprint) then occurs downstream (meaning to the right in the illustration) in terms of the mail flow, for example, wherein the weight of the mail good as determined by the scale, together with the external dimensions, leads to the respective necessary franking. The two measurement cells associated with the two weighing pans—respectively comprising a weighbar with a respective attached strain gauge—are arranged vertically cascaded so that the weight of the mail good and the total weight of the first weighing unit, and the weight of the second weighing pan, load the weighing cell of the second weighing unit as a preload. The advantages of this arrangement are explicitly described in the cited document, such that a reference to the earlier prior art may inasmuch be made. It is likewise stated that this principle may also be extended to more than two weighing units.

An additional dynamic scale is known from EP2017589 A2. In the embodiment described there, however, the weighing devices are not arranged so as to be functionally cascaded.

Given the dynamic scale according to EP2017589 A2, the second weighing pan is likewise arranged after the first weighing pan, downstream in terms of the mail flow. Relative to the dynamic scale according to EP 2520911 A1, the dynamic scale according to EP2017589 A2 has the disadvantage that the second weighing cell is not yet loaded if a weighed good advances to the first weighing pan. The second weighing cell may thereby only later swing to the weight value of the weighed good, namely when said weighed good advances to the second weighing pan.

The maximum structural length of the modules of the Centormail® franking system known from the prior art is 550 mm. The structural length of the "dynamic scale" module according to the invention should be maintained without modification; in spite of this, the throughput of weighed goods should be increased.

SUMMARY OF THE INVENTION

In accordance with the invention, a dynamic scale achieves a higher throughput of items to be weighed by at least one of a spring steel sheet being installed in the travel direction of the first shaft of the first transport belt, and/or control of the motors, as well as transmission of sensor signals, taking place via ribbon cables that are arranged parallel to the transport belts, and/or an electronic evaluation of interference oscillations of signals from the sensors of the weighing cell taking place with at least one lowpass filter being used, and at least two digital notch filters being used.

The present invention concerns a dynamic scale with two weighing units, wherein each weighing unit is equipped with at least one weighing pan installed on a frame and with a weighing cell (W1, W2) that is arranged on a weighbar (Wb1, Wb2), wherein the respective weighing pan is situated on an upper level and the weighing cell is arranged between the upper level and a lower level at a distance from the upper level in the direction of gravity. The weighing cell (W2) of a second weighing unit is arranged functionally cascaded relative to the weighing cell (W1) of a first weighing unit in the direction of gravity, the second weighing unit being attached with its lower plane to a floor plate (B) of the dynamic scale (1) that is situated in an x/z reference plane of a coordinate system, wherein a respective electronic measurement value processing unit (EV1, EV2) is associated with the weighing cells (W1, W2). With at least one sensor and with a transport device for a transport of a weighed good standing on edge in a transport direction z during the weighing in each weighing unit, wherein each transport device has a transport belt, a motor (M1, M2) to drive the aforementioned transport device and an encoder (E1, E2).

With a transmission of the control signals from a joint control unit (GST) to the motors (M1, M2) and with a transmission of the output signals of the electronic measurement value processing units (EV1, EV2) of the first weighing cells (W1, W2) to the inputs of the joint control unit (GST).

The dynamic scale according to the invention has at least one of the following features.

(1) A spring steel sheet (F) is installed on a first shaft or a stationary axle of a deflection roller (4.1) of the first transport belt (3.11) running in the transport direction z of the weighed good, which spring steel sheet (F) projects beyond the first shaft or the stationary axle by a length (L) counter to the transport direction of the transport belt (3.11), wherein the spring steel sheet is fashioned as a slide plate (3.12) on the length L and is bent with a part (Fa) in the direction of gravity at the mail intake side.

(2) The transmission of the control signals to the first motor (M1) takes place via a first and second ribbon cable (K1, K2) which has a thickness and a width, wherein the width is greater than the thickness, wherein the surfaces on the broad side of the ribbon cable are arranged parallel to the surfaces of the weighbars that are respectively provided with a weighing cell, and wherein both the transmission of the output-side control signals of the joint control unit (GST) to the second motor (M2) and the transmission of the output signals of the electronic measurement value processing unit (EV1) of the first weighing cell (W1) to the inputs of the joint control unit (GST) take place via the first ribbon cable (K1).

(3) A third feature that is a combination of:

a) the two motors (M1, M2) provided for the propulsion of the transport belts are of identical design and respectively have a motor shaft (8.1, 9.1) that is angled towards the floor plate (B) in the x-direction, wherein the smallest distance of the motor shafts (8.1, 9.1) from the floor plate (B) is smaller than or equal to the largest external diameter of the motors (M1, M2), b) the first weighing pan (arranged upstream in terms of the mail flow) is installed on a first frame (T1) and a second weighing pan (arranged in the transport direction z) is installed on a second frame (T2), and on the back side of each frame (T1, T2) a respective adapter (Ad1, Ad2) is provided that is installed on the associated frame (T1, T2), wherein the second motor (M2) is arranged vertically (with a tolerance of less than or equal to ±10 mm) below the second adapter (Ad2) on the second frame (T2); wherein the second frame (T2) rests on the one end of a support (Tr2); wherein the other end of the support (Tr2) is installed at a load introduction point (La2) of the weighbar (Wb2), c) the motors (M1, M2) are arranged symmetrically relative to the load introduction point (La2) of the weighbar (Wb2), with a tolerance of less than or equal to ±10 mm, and d) a gearbox (6.0, 7.0, 8.0, 9.0) installed on the frame (T1, T2) has toothed belt wheels (4.3, 5.3, 6.0, 7.0, 8.3, 9.3), [sic] in that the toothed belt wheels run in the same direction as the motors (M1, M2) via a gearing conversion, and the motor speed is chosen so that—below a maximum transport velocity Vmax—the parasitic oscillations affect a measurement value determined from the signals of the weighing cells only in a tolerance range of ±0.6 g.

A "weighing pan" in the context of the invention is formed of a transport device and a guide wall to guide mail pieces standing on edge, which mail pieces are transported in the transport direction z by a transport belt of the transport device.

1. Installation of a spring steel sheet on the first (in the travel direction of the mail good) shaft of the first transport belt in the travel direction of the mail good), which spring steel sheet protrudes beyond this counter to the travel direction of the transport belt. The spring steel sheet mounted according to the invention extends the transport belt (and thus the first weighing plate) mechanically, and thus enables the earlier weighing of longer mail pieces. Moreover, the spring steel sheet is curved downward on the mail intake side. This can take place simply via a bending of the plate at the mail intake side, for example at an angle of 40° downward; alternatively, a rounding of this region may also be present. The installation of the spring steel sheet according to the invention not only extends the weighing pan but rather also—via the bending or, respectively, rounding of the mail intake side—also leads to a reduction of shocks that arise due to the propulsion of the mail piece. In this way, oscillations of the first weighing pan are markedly reduced, with the result of an increased weighing precision and increased letter throughput since the settling time is shortened. The bending of the spring steel sheet according to the invention should thereby be in a range from 30-50 degrees, preferably 40 degrees. Given a scale that is designed for normal (mixed) mail goods from DIN C6-DIN B4, the end of the spring steel sheet at the mail intake side should be 3-5 (preferably 4) cm below the plane of the transport belt. The spring steel sheet is preferably installed at the first shaft of the transport belt, as considered in the direction of mail travel. Alternatively, the spring steel sheet may also be installed on a first axis of the transport belt in the direction of mail travel. (FIG. 4).

2. The control of the motors as well as the transmission of the weight signals from the sensors take place via a ribbon cable which is arranged parallel to the weighbars. The weighbars, and the weight measurement that takes place with this via strain gauges, have already been shown in the prior art (see EP2520911A1, Paragraphs 30-35). To transmit the sensor data as well as the motor control (drive and measurement of the rotation speed), in the prior art a wireless transmission is proposed, for example via infrared signals, via radio or inductive transmission (see EP 2520911A1, Paragraphs 72-75). In the professional world there was therefore an obvious preconception that such a transmission leads to measurement interference, for example to the injection of interfering bending forces in the event that a cable were used for this. The use of ribbon cables according to the invention overcomes this bias: it can be shown that no injection at all of error-increasing bending forces or oscillations takes place as long as the ribbon cable has a diameter smaller than 0.3 mm and is arranged parallel to the weighbar. The surface of the ribbon cable thereby runs parallel to the surface of the weighbar that is provided with the strain gauges, which surface of the weighbar in turn runs parallel to the floor plate.

3. Moreover, it has been shown that an electronic filtering of interfering oscillations is advantageous given the operation of a dynamic scale according to EP2520911. An analysis of the oscillations occurring upon operation of the scale shows that there are a multitude of interferences, in particular interfering oscillations upon operation of the dynamic scale. Additional sources of interference are the devices adjoining the scale for the individualization and propulsion of the mail pieces, upstream in the direction of the mail flow, as well as the franking downstream in terms of the mail flow. Moreover, each arrangement has a certain eigenfrequency, wherein resonances occur with the aforementioned other sources of oscillation. To overcome this problem, according to the invention it is proposed to increase the eigenfrequency of the device in that the arrangement of a first and second weighing unit has as small a mass as possible given a simultaneously high rigidity.

Via the known correlation $$\omega_0 = \sqrt{\frac{c}{m}},$$

the eigenfrequency is shifted to higher values by reducing the mass or, respectively, increasing the rigidity.

According to the invention, this is achieved in particular by a design of the frame and of the support that respectively have a plurality of clearances in order to reduce the mass. At the same time, aluminum or an aluminum alloy with defined rigidity (for example AlMg3 F28 with particularly suitable cold ductility and high tensile strength (Rmca 280 N/mm$^2$)) is used as a predominant structural material in order to increase the rigidity. Moreover, ribs are provided in order to damp oscillations. The entire construction (including the stiffening ribs) is preferably riveted since this not only allows a cost-effective manufacturing but also contributes to the oscillation damping via micro-friction in the rivet joints.

Moreover, the motors are arranged as close as possible to the centers of gravity of the respective weighbars in order to keep the interference as small as possible. For this, in particular the two motors provided for propulsion of the transport belts are a) arranged as close as possible to the base plate,
b) arranged optimally vertically below the adapters of the respective associated weighing cells,
c) arranged optimally symmetrically relative to the point of the load introduction into the weighing cell 2, and
d) via gearing conversion, the motors run in the same direction and the motor speed is as high as possible.

Overall, through the described measures a shift of the eigenfrequency results into a range that can be filtered out by a lowpass filter without additional measures, and thus said eigenfrequency no longer interferes with the measurement. For example, a lowpass filter is used that attenuates by at least 20 dB (preferably at least 30 dB) above approximately 20 Hz (preferably already above 15 Hz). According to the invention, the eigenfrequency of the dynamic scale is above 25 Hz (for example between 30 and 50 Hz).

The aforementioned, internally generated interference frequencies due to the drives are in particular minimized via adaptation of the two motors and their gearings and the gear ratio to the transport belts. The drive force that is respectively geared down by a gearing is injected that of the two deflection rollers of the transport belt which is situated closer to the device middle of the dynamic scale. Each gearing includes a toothed belt wheel with toothed belts on the input side of the gearing; a double toothed belt wheel which increases the torque given only a very small bearing friction loss; and a toothed belt wheel with toothed belts at the output side of the gearing. It is likewise advantageous that all toothed belt wheels turn in the same direction.

For example, the torque $M_{An}$ output by the motor is increased by a factor of 1.6 (meaning that $M_{Ab}=M_{An}\cdot 1.6$) and the motor speed $n_{An}$ is reduced by a factor of $1/1.6=0.6237$ (meaning that $n_{Ab}=0.6237\cdot n_{An}$). Overall, the gear conversion ratio $i_G=i_{8-6}/i_{6-4}=(37\cdot 26)/(25\cdot 24)=1.6033$ is chosen so that interfering oscillations only occur at higher transport velocities than given the chosen desired transport velocity for the mail pieces to be transported. The remaining interference oscillations are filtered out of the weighing measurement signal electronically.

The gearing conversion was selected so that the motor speed at the predetermined system velocity is as high as possible but still well below the system eigenfrequency. On the one hand, it is thereby achieved that the interfering forces and oscillations that are impressed by the motor due to rotating masses are markedly damped by the electronic filter system (lowpass filter, only effective below a defined frequency), and thus lead only to relatively small, negligible measurement errors. On the other hand, the internally generated interference frequencies at the chosen motor speeds are markedly below the system eigenfrequency, such that there are no resonance effects, and thus no undefined interference forces and oscillations are impressed in the scale. Moreover, the noise development is strongly reduced via the operation below the resonance frequency. Not only are the interference forces impressed by the motors therefore markedly reduced, but the possibility is also achieved to mask out the interfering, externally injected oscillations via adapted notch filters, in particular digital notch filters. Such digital notch filters are already noted in the prior art and need no further explanation at this point. For example, for the purpose according to the invention notch filters may be used that attenuate the external interference oscillations (for example 9 Hz) and the first harmonic oscillation (here corresponding to 18 Hz) associated with this by at least 60 dB, preferably at least 70 dB.

Overall, via this arrangement a minimization of the interferences is achieved so that a maximum transport velocity of 700 mm/s may be achieved without noteworthy interferences (in particular resonances) occurring (see FIG. 3), while in the device according to EP 2520911A1 only a transport velocity of 400 mm/s could be achieved since the interferences would be too great upon exceeding this velocity.

The weighing units necessary to execute this invention, each with a weighing cell and a weighing pan, sensors, transport device, motors, encoders, control units and their outputs and electrical connections, are already described in detail in the document EP 2520911A1 and therefore need no further explanation at this point. The same applies to the functionally cascaded arrangement of the weighing units.

Naturally, the aforementioned measures 1-3 may be implemented individually or in any arbitrary combination. According to the invention, the realization of all measures in one apparatus is preferred.

In a preferred embodiment of the invention, shorter weighed goods (mail pieces up to the length of the DIN C6 size) are weighed in the first weighing unit, while longer mail pieces (longer than the length of the DIN C6 size) are weighed by the second weighing unit. In this embodiment, a particularly short passage (and therefore a particularly high letter transport) may be realized. It has been found that, via the measures according to the invention, the mail throughput may be increased to up to 90 mail pieces per minute given mail pieces of the length of the DIN C6 size or, respectively, up to 110 mail pieces per minute given mail pieces of the DIN C6 size, without additional errors occurring in the weighing.

The further advantages of the invention result from Figures that, however, are to be understood merely as examples, and that should not include any limitation. For a further comprehension of the invention, reference is hereby additionally made to the document EP 2520911 A1 and its Figures.

DESCRIPTION OF THE PREFERRED EMBODIMENTS

Figure 1:
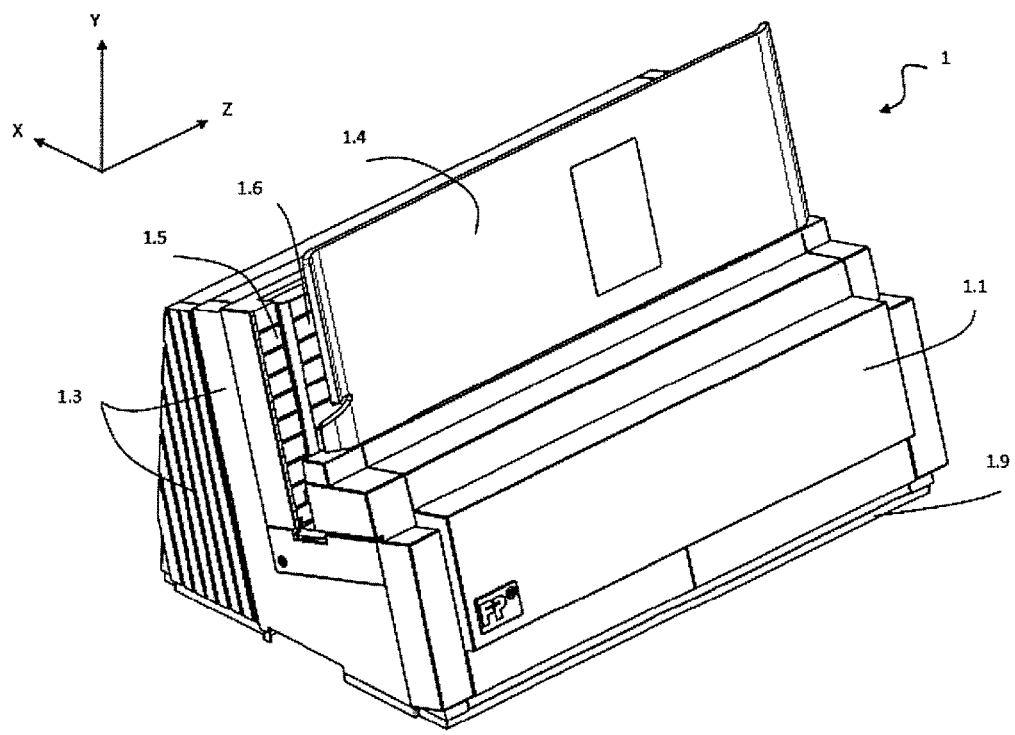
FIG. 1 is a perspective view of a dynamic scale according to the invention.

FIG. 1 shows the fundamental design of the scale according to the invention in a front view. The transport belt according to the invention is thereby occluded by the Plexiglas plate (1.4).

Figure 2:
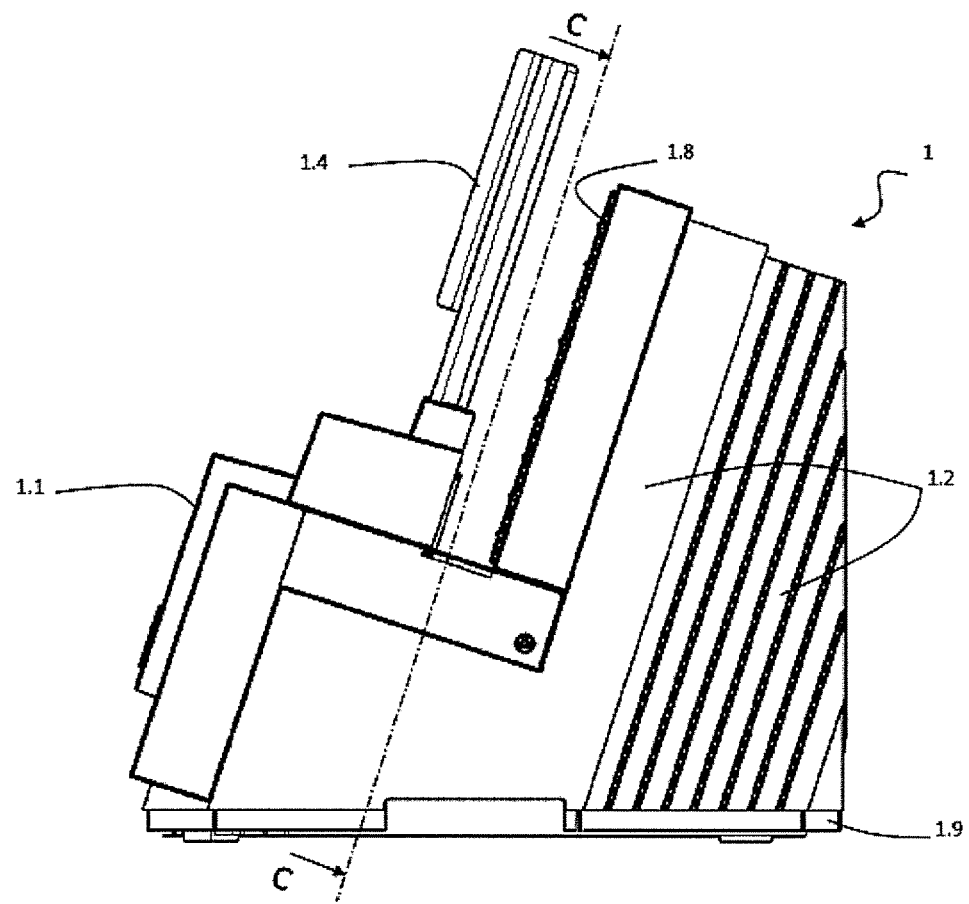
FIGS. 2 and 3 show the dynamic scale of FIG. 1, in respective elevational views from opposite sides.
Figure 3:
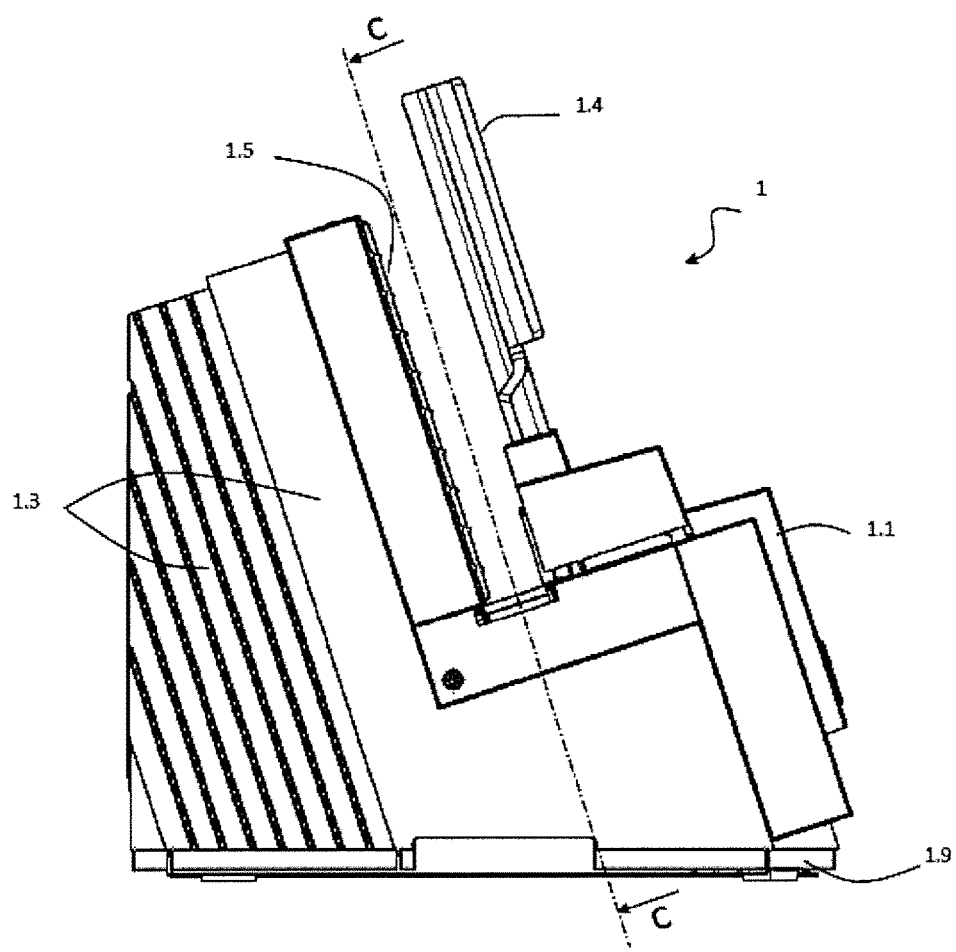

FIGS. 2 and 3 show the side view. The inclination of the weighing pans is clearly visible.

Figure 4:
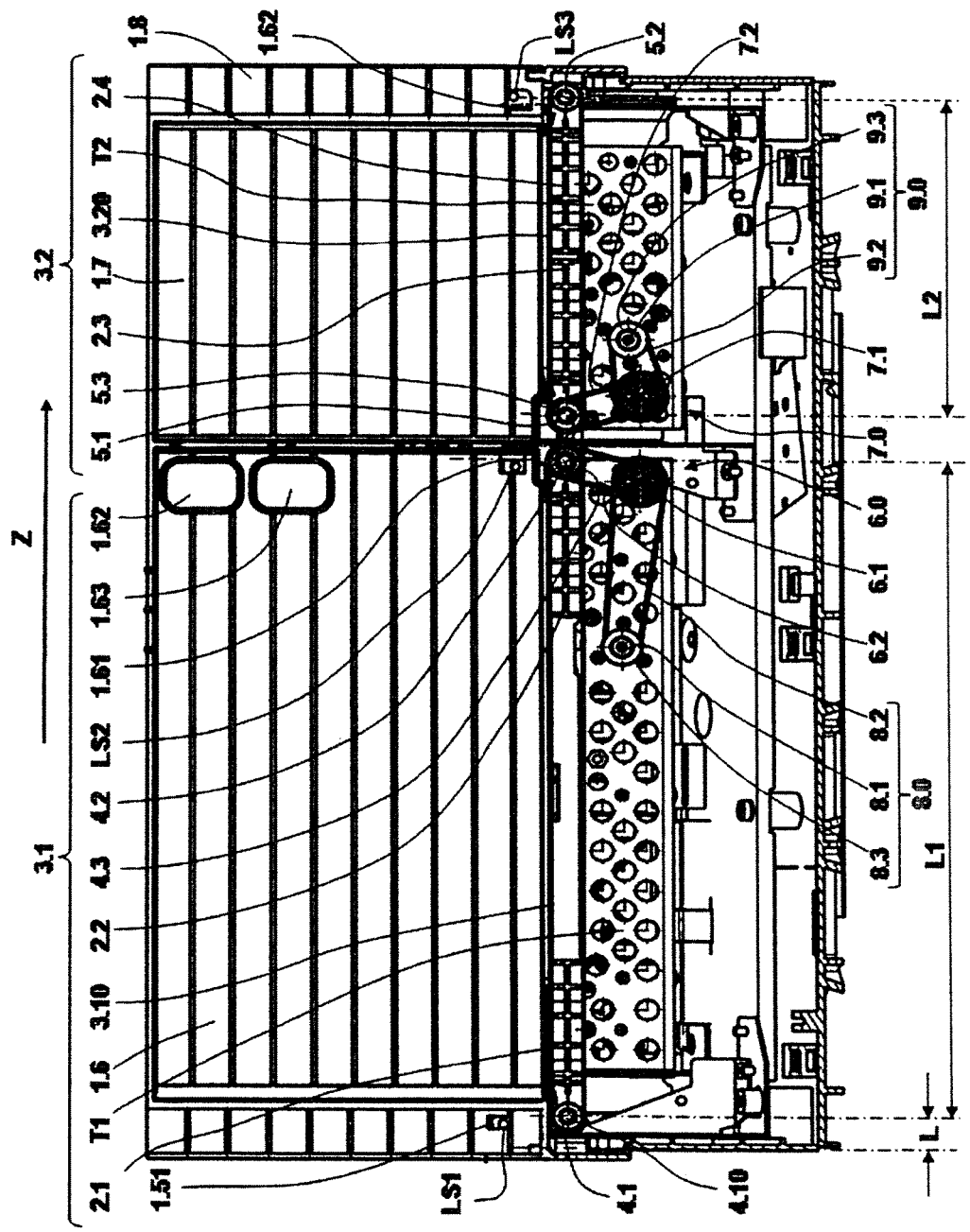
FIG. 4 shows the dynamic scale in accordance with the invention, with exterior parts removed to show interior components.
Figure 5:
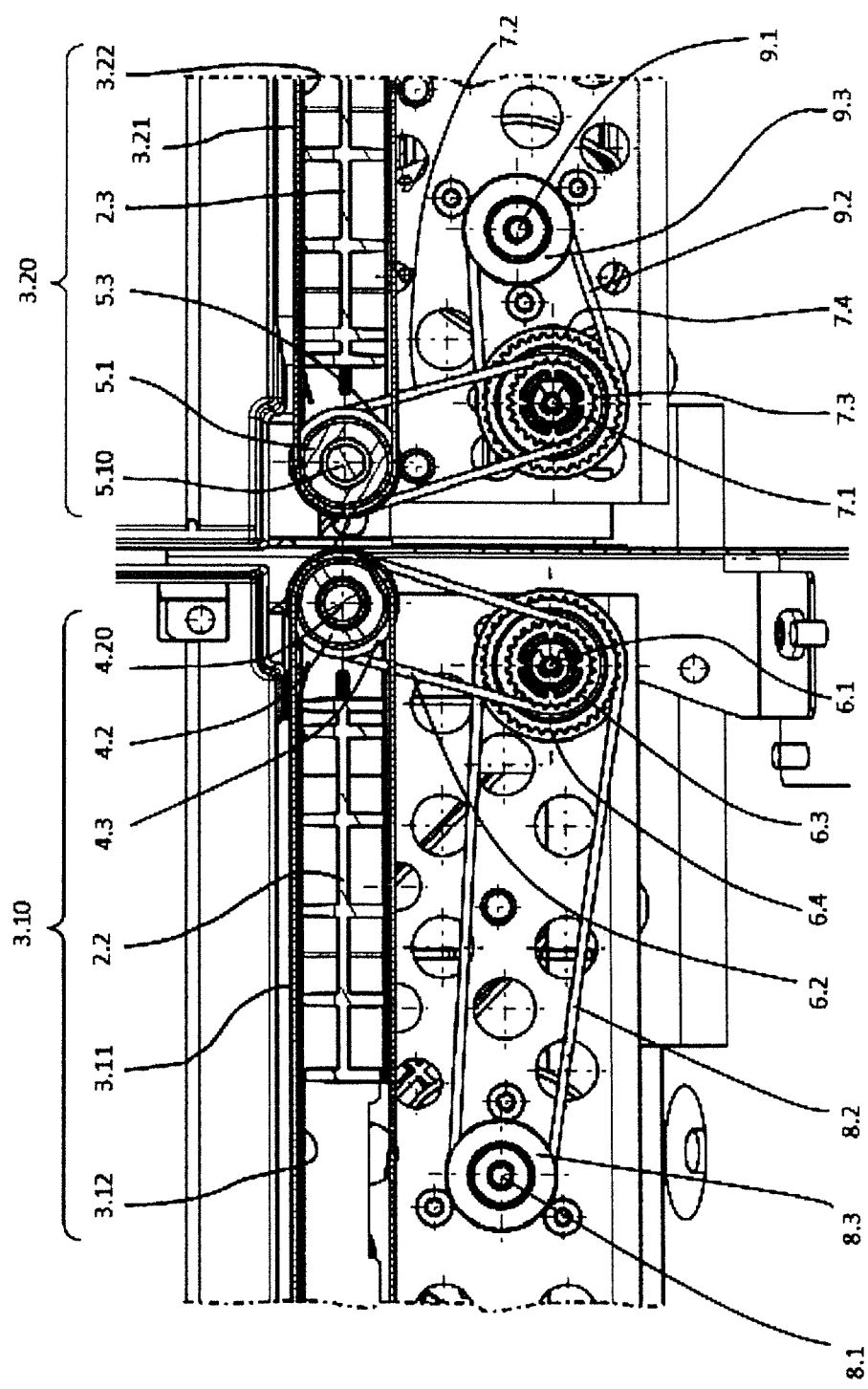
FIG. 5 is a side view of certain drive components of the dynamic scale in accordance with the invention.

FIG. 4 shows an open presentation of the scale according to the invention. The drive devices of the transport belts are clearly recognizable. These are shown again in detail in the following FIG. 5. Clearly recognizable are the motor shafts of the motors M1 and M2 and the toothed belts associated with these, which produce the propulsion of the transport frame via a gearing. The weighing pan 1 with a length L1, the weighing pan 2 with a length L2 and the spring steel sheet F with a length L are apparent. The length L1 of the weighing plate 1 may thereby be 240-340 mm, preferably approximately 331 mm. The length L2 of the weighing plate 2 may thereby be 150-180 mm, preferably approximately 161 mm. The length L of the spring steel sheet F may thereby be 14-21 mm, preferably approximately 18 mm.

Figure 6:
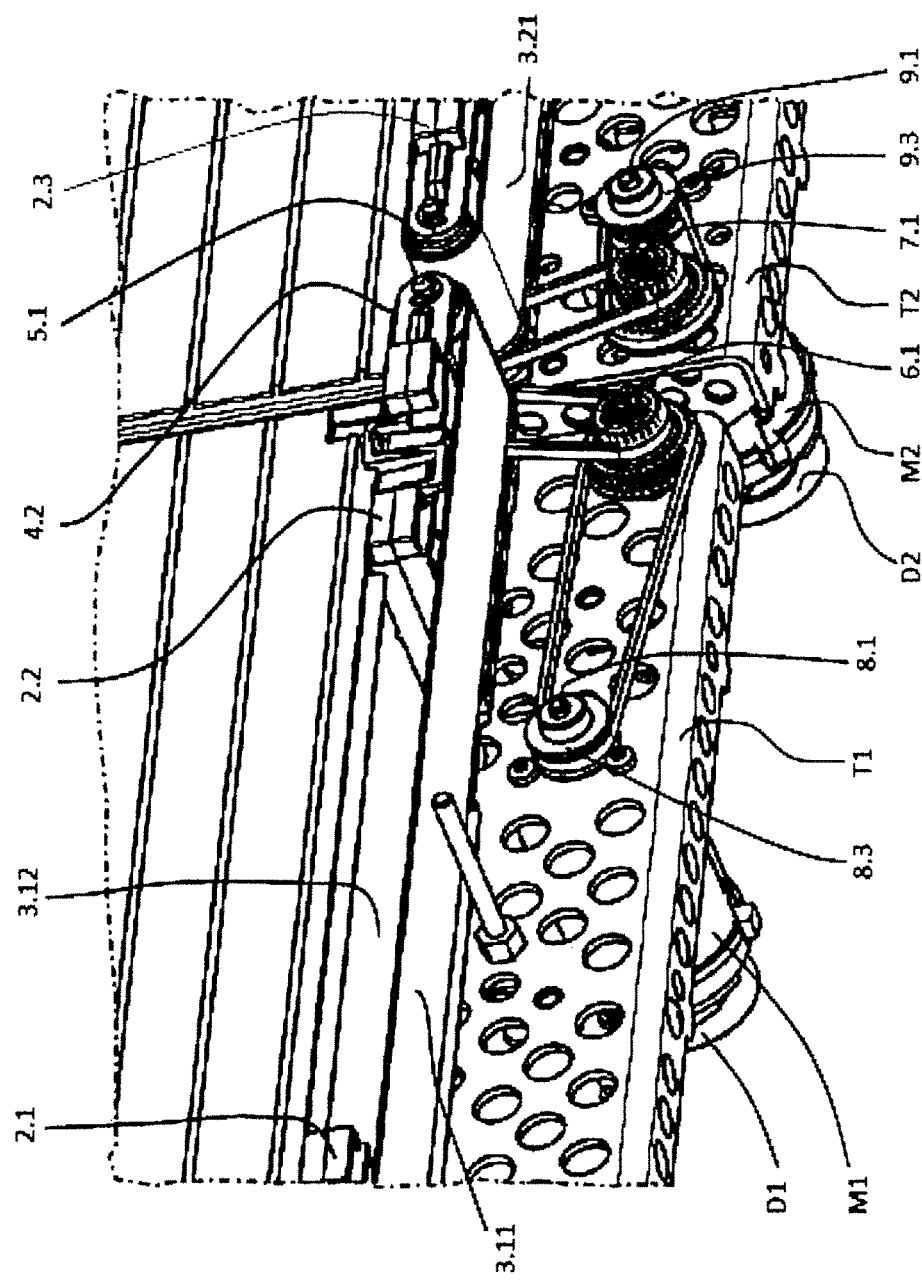
FIG. 6 shows the drive components of FIG. 5, in a perspective view.

FIG. 6 shows this arrangement again from a different perspective.

Figure 7:
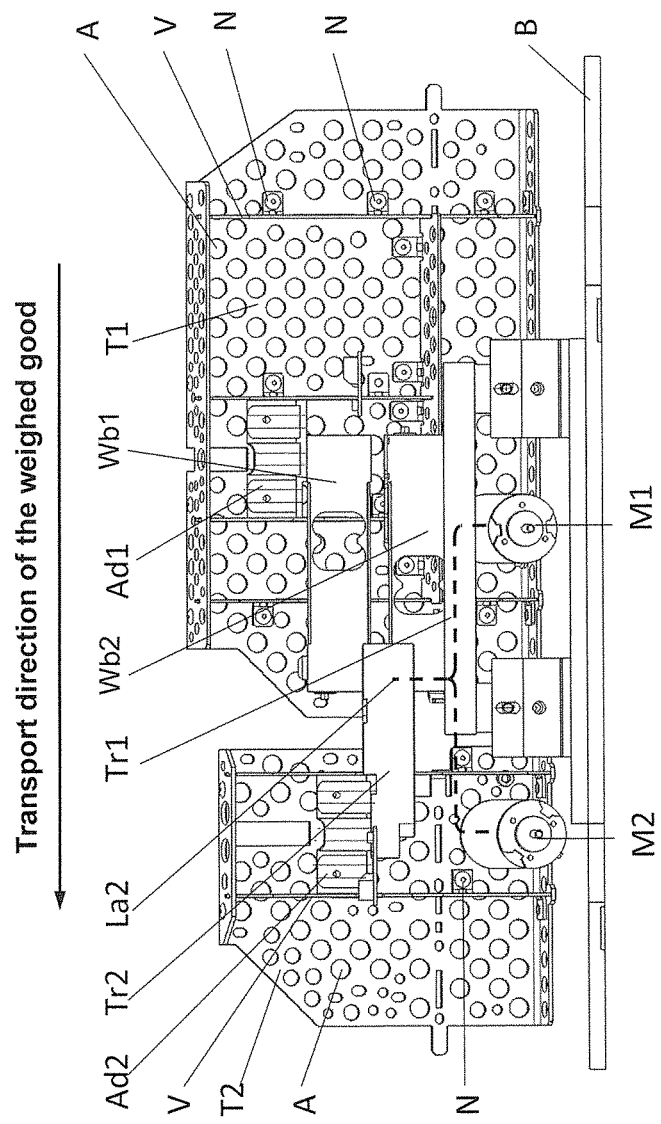
FIG. 7 illustrates basic components of the scale according to the invention for explaining the operation thereof.

FIG. 7 shows the fundamental design of the scale according to the invention. A perspective depiction of the arrangement of the electrical and mechanical modules of the dynamic scale is visible from the rear. In this depiction, the weighed good travels from right to left (in the direction of the arrow). A plurality of clearances (A, only a few examples are shown) in the basic construction comprised of frame and support, which clearances reduce the mass according to the invention, are clearly apparent. The clearances in the supports Tr1 and Tr2 are applied vertically, such that they are not apparent from the depicted perspective.

The two drive motors M1 and M2 are located near the floor plate B. Clearly apparent are the positioning of the motor 1 (M1), which is located nearly vertically below the adapter 1Ad1 of the weighing cell 1, while the motor 2 (M2) is located nearly vertically below the adapter 2Ad2 of the weighing cell 2. Both motors are arranged symmetrically in relation to the point of the load introduction into the weighing cell 2 (indicated by dashed lines).

Moreover, various stiffening elements (V) are apparent that have in turn been attached with rivets (N); for better clarity, these are labeled with reference characters only in part.

Figure 8:
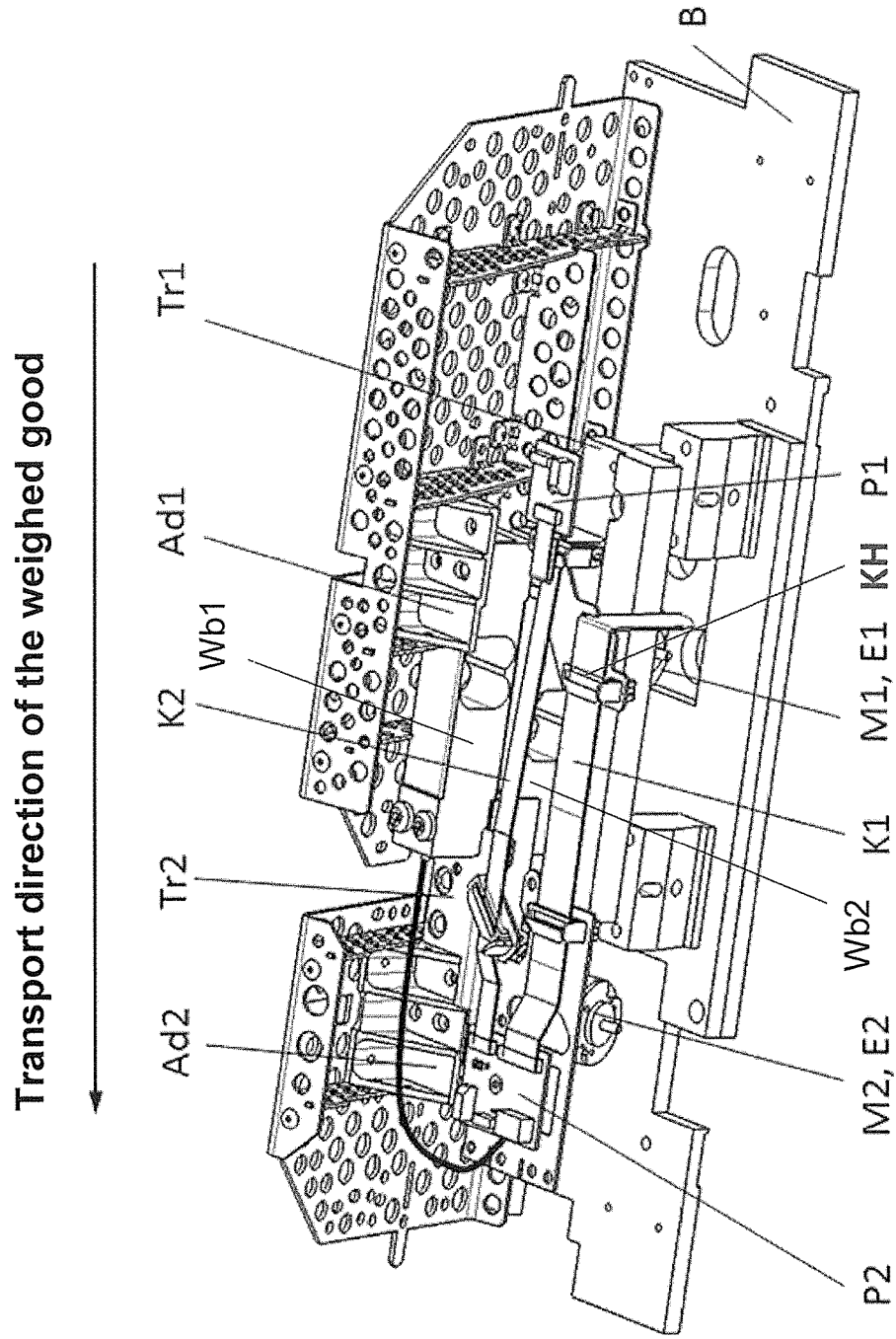
FIG. 8 shows the dynamic scale according to the invention, with components mounted on the faceplate thereof, with the exterior housing removed.

FIG. 8 shows additional details of the device according to the invention from a different perspective, with particular depiction of the electrical modules. Here as well, the transport direction of the weighed good travels from right to left (arrow). Visible in particular here are the two ribbon cables that are arranged with the flat side parallel to the weighing cells or, respectively, the floor plate. Clearly visible is the circuit board of the weighing cell 2, which ensures the transfer of the electrical signals into a round cable. Also well visible in this perspective are the rivet joints (N), the stiffening elements (V) and the clearances (A).

Figure 9:
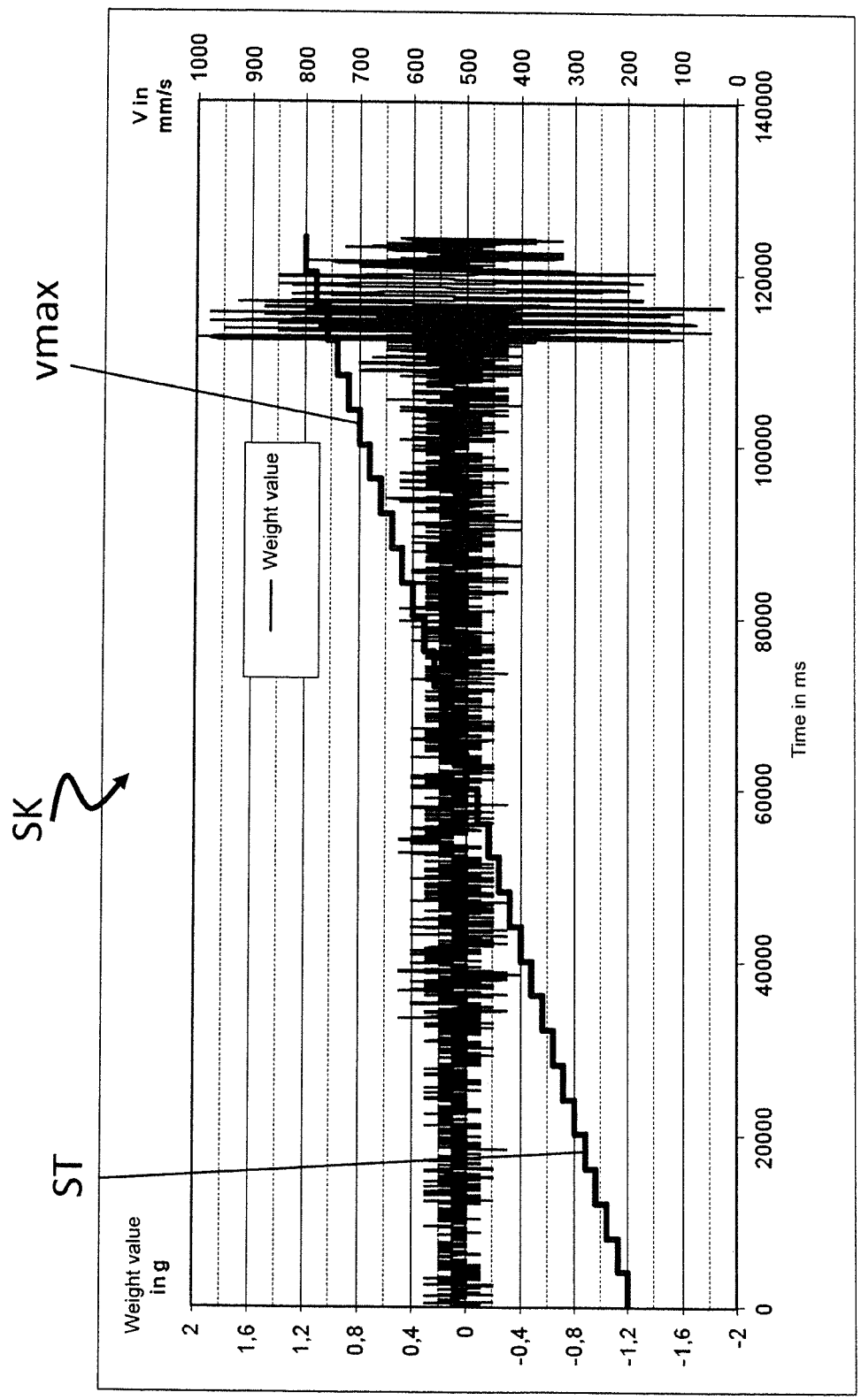
FIG. 9 is a graph showing the measurement of interference forces dependent on transport velocity in the dynamic scale according to the invention.

FIG. 9 shows the measurement result of a measurement of interference forces depending on the transport velocity. For this, the transport velocity was increased step by step from approximately 200 to approximately 800 mm/s. It is clearly apparent that the measurement error hardly varies given a variation of the transport velocity from approximately 200 to approximately 720 mm/s. As of approximately 740 mm/s, clearly visible interferences occur that adulterate the result in such a way that it is no longer acceptable for the purpose according to the invention. However, given a transport velocity of 700 mm/s the weighing may take place with sufficient precision.

Figure 10:
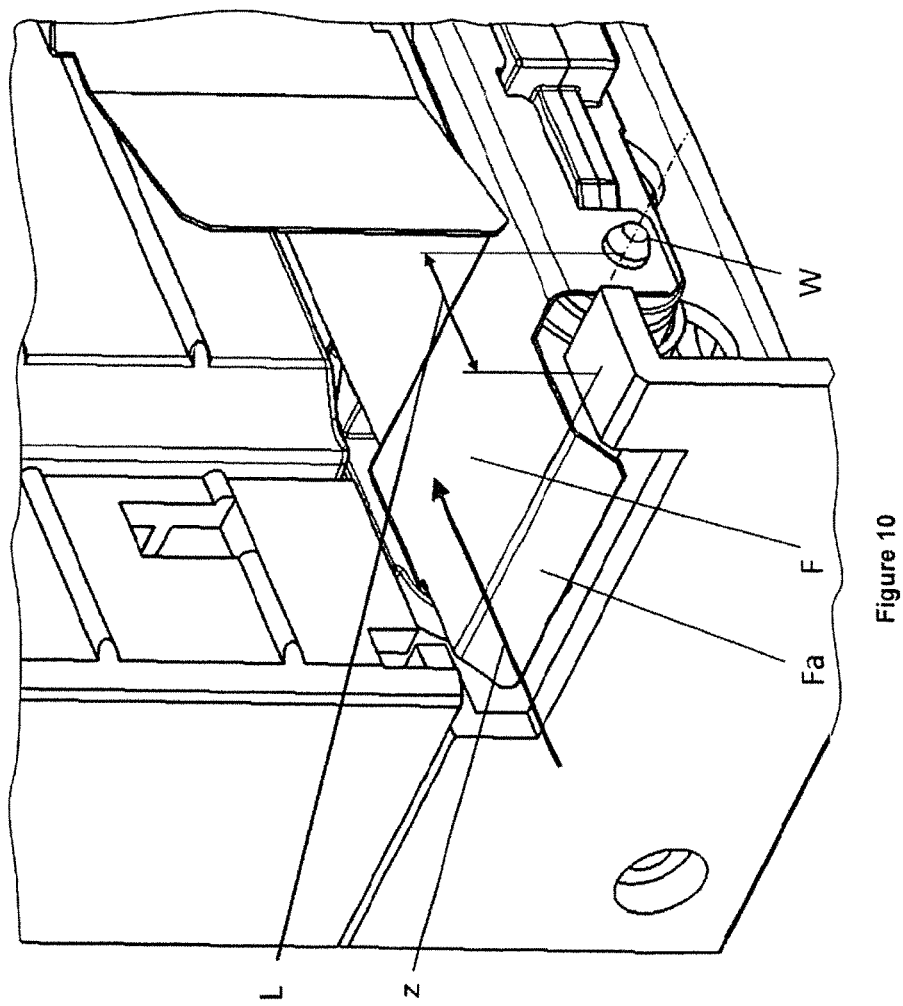
FIG. 10 illustrates the installation of a spring steel sheet according to the invention.

FIG. 10 shows the spring steel sheet attached according to the invention. The travel direction of the weighed good thereby occurs in the direction of the arrow (here from left to right). The attachment to the first shaft (W) of the first transport belt is clearly apparent. Likewise visible is the bent part of the spring steel sheet $F_a$, which shows a bend of approximately 40°. Moreover, it is apparent that an extension of the weighing plate by the length L takes place via the spring steel sheet according to the invention, which extension begins at the bend angle and ends with the shaft.

Figure 11:
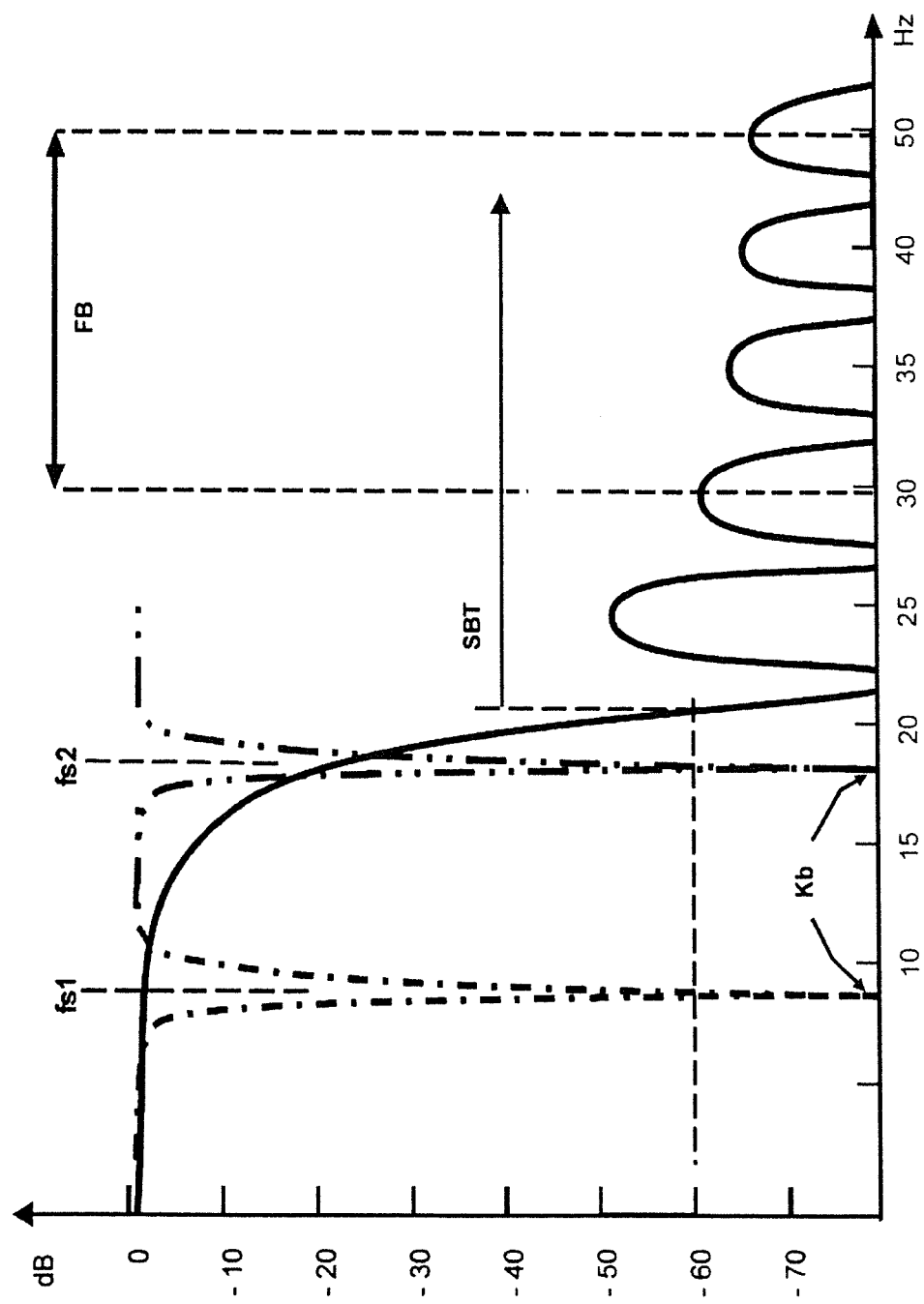
FIG. 11 shows the application of filtering in accordance with the present invention.

FIG. 11 shows the application of the filter according to the invention. Clearly apparent in this illustration are the stop bands of the two notch filters, here shown at approximately 9 and approximately 18 Hz, for example. Moreover, the stop band of the lowpass is apparent. Via the measures according to the invention which have been explained in the preceding description, the eigenfrequency of the dynamic scale is shifted in the stop band of the lowpass filter, such that the interferences are minimized in this way. The maximum transport velocity Vmax=700 mm/s has been determined empirically.

Figure 12:
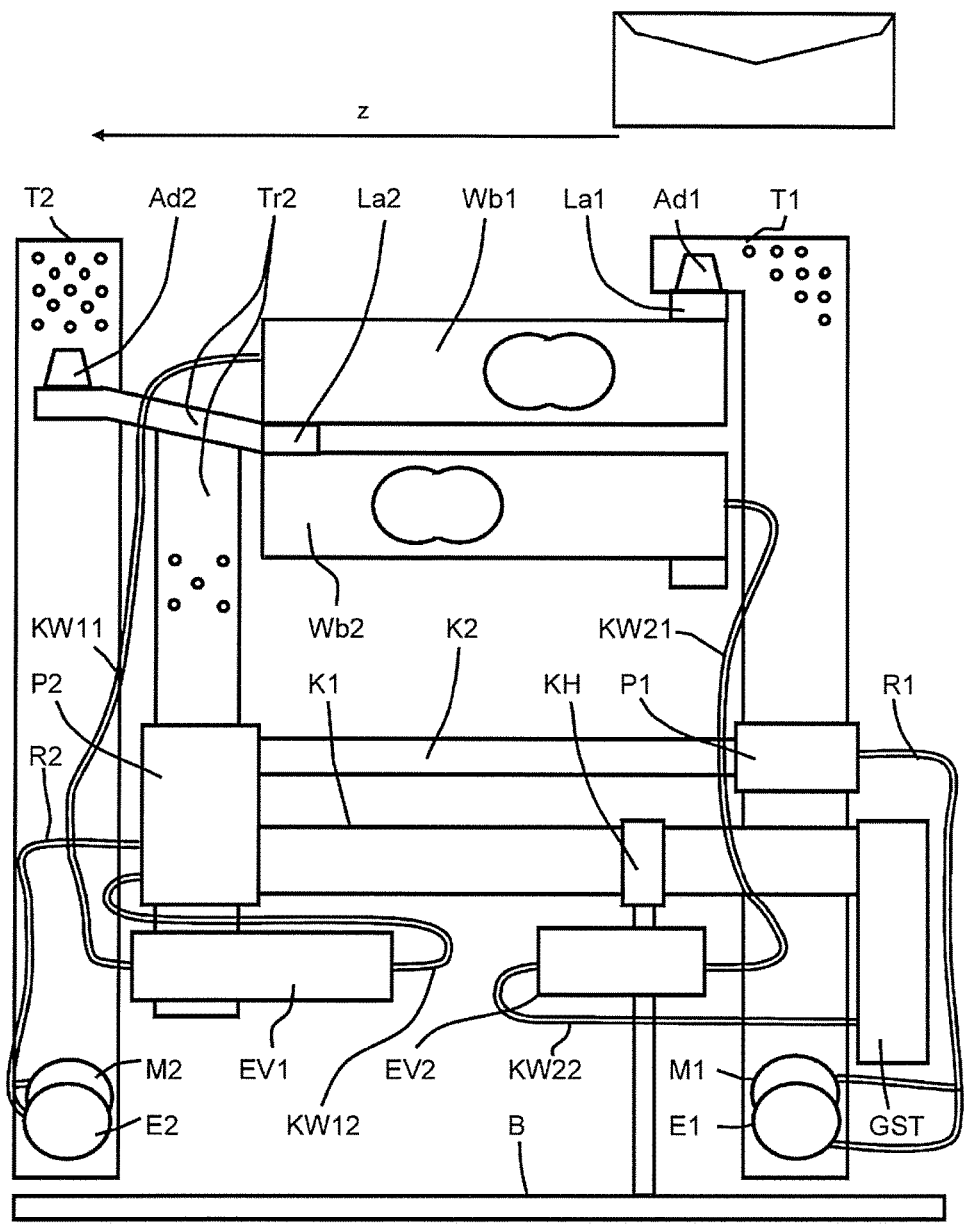
FIG. 12 schematically illustrates perspective paths of ribbon cables in accordance with the present invention.

FIG. 12 shows a schematic depiction of the cable runs within the dynamic scale. A first round cable R1 electrically connects the first circuit board P1 with the first motor M1 and the first encoder E1. The first circuit board P1 is installed on the first frame T1. The first round cable R1 exiting from the first circuit board P1 serves for the transmission of the control signals to the first motor M1 and a transmission of the encoder signals from the first encoder E1 to the first circuit board P1. It is provided that the adapter Ad1 of the first frame T1 rests at the load introduction point La1 of the first weighbar Wb1.

A second round cable R2 electrically connects the second circuit board P2 with the second motor M2 and the second encoder E2. The second circuit board P2 is installed on the support Tr2. The second round cable R2 exiting from the second circuit board P2 serves for the transmission of the control signals to the second motor M2 and a transmission of the encoder signals from the second encoder E2 to the second circuit board P2. It is provided that the adapter Ad2 of the second frame T2 rests at the one end of the support Tr2, wherein the other end of the support Tr2 is installed at a load introduction point La2 of the first weighbar Wb2.

A shielded round cable KW11 travels from the first weighbar Wb1, which shielded round cable KW11 is connected with the input of the first electronic measurement value processing unit EV1. The first electronic measurement value processing unit EV1 and the second circuit board P2 are mechanically connected with the support Tr2. A shielded round cable KW12 travels from the output of the first electronic measurement value processing unit EV1, which shielded round cable KW12 is electrically connected with the second circuit board P2.

A shielded round cable KW21 travels from the second weighbar Wb2, which shielded round cable KW21 is connected with the input of the second electronic measurement value processing unit EV2. The second electronic measurement value processing unit EV2 and a cable clip KH are mechanically connected with the floor plate B and are arranged in the region of the frame T1, preferably near the back side of the dynamic scale and thereby opposite the frame T1. A shielded round cable KW22 travels from the output of the second electronic measurement value processing unit EV2, which shielded round cable KW22 is electrically connected with the input of the joint control unit GST.

Arranged between the second circuit board P2 and the cable clip KH is a first ribbon cable K1 with the flat side parallel to the floor plate B, wherein both the transmission of the output control signals of the joint control unit GST to the second motor M2 and the transmission of the encoder signals from the second encoder E2 and the transmission of the output signals of the electronic measurement value processing unit EV1 to the inputs of the joint control unit GST take place via the first ribbon cable K1.

Arranged between the first circuit board P1 and the second circuit board P2 is a second ribbon cable K2 with the flat side parallel to the floor plate B. The first circuit board P1 is mechanically connected with the first frame T1. The transmission of the control signals to the first motor M1 and a transmission of the encoder signals from the first encoder E1 take place via the second ribbon cable K2. The first circuit board P1 thereby serves for the adaptation of the first round cable R1 to the second ribbon cable K2.

REFERENCE LIST (FIGS. 1-6)

1 dynamic scale
1.1 housing faceplate on the front side of the dynamic scale
1.2 right side part of the housing, downstream in terms of the mail flow
1.3 left side part of the housing, upstream in terms of the mail flow
1.4 Plexiglas protective plate on the front side of the dynamic scale
1.5 left guide wall with sliding ribs, upstream in terms of the mail flow
1.51 window in the left guide wall
1.6 guide wall with sliding ribs of the first weighing pan
1.61 a first window in the guide wall of the first weighing pan
1.62 a second window in the guide wall of the first weighing pan
1.63 a third window in the guide wall of the first weighing pan
1.7 guide wall with sliding ribs of the second weighing pan
1.8 right guide wall with sliding ribs, downstream in terms of the mail flow
1.81 window in the right guide wall
1.9 floor plate of the dynamic scale
2.1, 2.2 belt support for the transport device of the first weighing pan
2.3, 2.4 belt support for the transport device of the second weighing pan
3.1 first weighing pan
3.10 transport device of the first weighing pan 3.1
3.11 transport belt of the transport device of the first weighing pan
3.12 sliding plate for the transport belt of the first weighing pan
3.2 second weighing pan
3.20 transport device of the second weighing pan 3.2
3.21 transport belt of the transport device of the second weighing pan
3.22 sliding plate for the transport belt of the second weighing pan
4.1, 4.2 two deflection rollers of the transport device of the first weighing pan
4.10 a stationary rotation axle of the deflection roller 4.1 for the transport belt 3.11
4.20 a drive shaft of the deflection roller 4.1 for the transport belt 3.11
4.3 a toothed belt wheel has 26 teeth and is positively coupled with deflection roller 4.2 and drive shaft 4.20
L length of the spring steel sheet (F)
L1 length of the first weighing pan
L2 length of the second weighing pan
5.1, 5.2 two deflection rollers of the transport device 3.20 of the second weighing pan 3.2
5.10 drive shaft of the deflection roller 5.1 for the transport belt 3.2
5.20 a stationary rotation axle of the deflection roller 5.2 for the transport belt 3.2
5.3 a toothed belt wheel has 26 teeth and is positively coupled with deflection roller 5.1 and drive shaft 5.10
6.0 a double toothed belt wheel of the gearing of the first motor M1
6.1 a stationary rotation axle of the double toothed belt wheel 6.0
6.2 a toothed belt for the toothed belt wheels 4.3 and 6.3
6.3 a toothed belt wheel of the double toothed belt wheel 6.0 at the output of the gearing has 24 teeth and serves to drive the transport device 3.10 of the first weighing pan 3.1
6.4 a toothed belt wheel of the double toothed belt wheel 6.0 at the input of the gearing has 37 teeth
7.0 a double toothed belt wheel of the gearing of the second motor M2
7.1 a stationary rotation axle of the double toothed belt wheel 7.0
7.2 a toothed belt for the toothed belt wheels 5.3 and 7.3,
7.3 a toothed belt wheel of the double toothed belt wheel 7.0 at the output of the gearing has 24 teeth and serves to drive the transport device
3.20 of the second weighing pan 3.2
7.4 a toothed belt wheel of the double toothed belt wheel 7.0 at the input of the gearing has 37 teeth
8.0 gearing of the first motor M1
8.1 a motor shaft of the first motor M1
8.2 a toothed belt for the toothed belt wheels 6.4 and 8.3
8.3 a toothed belt wheel at the motor shaft 8.1 of the first motor M1 has 25 teeth
9.0 gearing of the second motor M2
9.1 a motor shaft of the second motor M2
9.2 a toothed belt for the toothed belt wheels 7.3 and 9.3

9.3 a toothed belt wheel at the motor shaft 9.1 of the second motor M2 has 25 teeth
10 belt support of the transport device of the first weighing pan
11 sliding plate
C-C intersecting line
D1 an encoding rotary disc for encoder E1
D2 an encoding rotary disc for encoder E2
E1, E2 two encoders
LS1-LS3 three sensors
M1, M2 two motors
T1 frame of the first weighing pan
T2 frame of the second weighing pan
x, y, z directions of a Cartesian coordinate system
z transport direction

REFERENCE LIST (FIGS. 7-12)

A clearances in the frames T1 and T2 of the weighing pans
Ad1 adapter for adaptation of the frame to the first weighbar Wb1
Ad2 adapter for adaptation of the frame to the second weighbar Wb2
B floor plate of the dynamic scale
E1 encoder for motor M1
E2 encoder for motor M2
EV1 first electronic measurement value processing unit
EV2 second electronic measurement value processing unit
fs1 notch frequency at which the 1st notch filter has a maximum signal attenuation
fs2 notch frequency at which the 2nd notch filter has a maximum signal attenuation
F spring steel sheet
Fa bent part of the spring steel sheet F
FB frequency range of the eigenfrequency of the dynamic scale
GST joint control unit
K1 ribbon cable used for voltage and signal supply for motor M1 and encoder E1, without force shunts
K2 ribbon cable used for voltage and signal supply for motor M1 [sic] and encoder E1 [sic], without force shunts
Kb notch
KH cable clip
KW11 shielded round cable that travels away from the weighbar Wb1
KW12 shielded round cable that travels away from the EV1
KW21 shielded round cable that travels away from the weighbar Wb2
KW22 shielded round cable that travels away from the EV2
L length by which the weighing pan is extended
La1 load introduction into the weighing cell W1
La2 load introduction into the weighing cell W2
M1 first motor
M2 second motor
N rivets (for attachment of the stiffening elements V) of the frame
P1 circuit board at the frame of the first weighbar WB1
P2 circuit board at the frame of the second weighbar WB2
R1 first round cable that travels away from the circuit board P1
R2 second round cable that travels away from the circuit board P2
SBT stop band of the lowpass
SK interference forces that are impressed by the drive depending on the drive speed, wherein the drive speed of the transport belt is proportional to the motor speed. The gearing design was chosen so that, at maximum transport velocity, the interference frequencies are below the eigenfrequency of the dynamic scale
ST step-by-step increase of the transport velocity
T1 frame of the first weighing pan
T2 frame of the second weighing pan
Tr1 support for the cascade arrangement of the weighbars
Tr2 support arranged at point La2 of the second weighbar
v transport velocity of the transport belt
$v_{max}$ maximum transport velocity of 700 mm/s
V stiffening elements in the frames T1 and T2 of the weighing pans
W shaft
W1 weighing cell of the first weighbar Wb1
W2 weighing cell of the second weighbar Wb2
Wb1 first weighbar
Wb2 second weighbar
z transport direction Although modifications and changes may be suggested by those skilled in the art, it is the intention of the inventor to embody within the patent warranted hereon all changes and modifications as reasonably and properly come within the scope of his contribution to the art.

We claim as our invention:

1. Dynamic scale with two weighing units, wherein each weighing unit is equipped with at least one weighing pan installed on a frame and with a weighing cell that is arranged on a weighing bar, wherein the respective weighing pan is situated on an upper level and the weighing cell is arranged between the upper level and a lower level at a distance from the upper level in the direction of gravity, wherein the weighing cell of a second weighing unit is arranged functionally cascaded for weighing, relative to the weighing cell of a first weighing unit, in the direction of gravity, the second weighing unit being attached with its lower plane to a floor plate of the dynamic scale that is situated in an x/z reference plane of a coordinate system;

wherein a respective electronic measurement value processing unit is associated with the weighing cells;

with at least one sensor and with a transport device for a transport of a good to be weighed standing on edge in a transport direction z during the weighing in each weighing unit, wherein each transport device has a transport belt, a motor to drive the aforementioned transport device and an encoder;

with a transmission of the control signals from a joint control unit to the motors and with a transmission of the output signals of the electronic measurement value processing units of the first weighing cells to the inputs of the joint control unit;

a spring steel sheet is installed on a first shaft or a stationary axle of a deflection roller of the first transport belt running in the transport direction z of the weighed good, which spring steel sheet projects beyond the first shaft or the stationary axle by a length counter to the transport direction of the transport belt, wherein the spring steel sheet is fashioned as a slide plate on the length L and is bent with a part in the direction of gravity at the mail intake side;

the transmission of the control signals to the first motor takes place via a first and second ribbon cable which has a thickness and a width, wherein the width is greater than the thickness, wherein the surfaces on the broad side of the ribbon cable are arranged parallel to the surfaces of the weighing bars that are respectively provided with a weighing cell, and wherein both the transmission of the output-side control signals of the joint control unit to the second motor and the transmission of the output signals of the electronic measurement value processing unit of the first weighing cell to the inputs of the joint control unit take place via the first ribbon cable; and a) the two motors provided for the propulsion of the transport belts are of identical design and respectively have a motor shaft that is angled towards the floor plate in the x-direction, wherein the smallest distance of the motor shafts from the floor plate is smaller than or equal to the largest external diameter of the motors, b) the first weighing pan (is situated upstream in terms) a flow of goods to be weighed and is installed on a first frame and a second weighing pan (in the transport direction z) is installed on a second frame, and on the back side of each frame a respective adapter is provided that is installed on the associated frame, wherein the second motor is arranged vertically (with a tolerance of less than or equal to ±10 mm) below the second adapter on the second frame; wherein the second frame rests on the one end of a support; wherein the other end of the support is installed at a load introduction point of the weighbar, c) the motors are arranged symmetrically relative to the load introduction point of the weighbar, with a tolerance of less than or equal to ±10 mm, and d) a gearbox installed on the frame has toothed belt wheels, [sic] in that the toothed belt wheels run in the same direction as the motors via a gearing conversion, and the motor operates at a speed, below a maximum transport velocity Vmax, so that parasitic oscillations affect a measurement value determined from the signals of the weighing cells only in a tolerance range of ±0.6 g.

2. Dynamic scale according to claim 1, wherein the first weighing unit is provided for quick measurement of a shortest weighed good and the second weighing unit is provided for quick measurement of a weighed good whose length is greater than that of the shortest weighed good, and in that the length of the first weighing pan in the transport direction z is greater than that of the second weighing pan.

3. Dynamic scale according to claim 1, wherein the frame and the weighing plates are produced from aluminum alloy AlMg3F28.

4. Dynamic scale according to claim 1, wherein the frames have stiffening ribs as stiffening elements (V).

5. Dynamic scale according to claim 1, wherein the eigenfrequency of the dynamic scale (1) is above 25 Hz.

6. Dynamic scale according to claim 5, wherein the eigenfrequency of the dynamic scale (1) is between 30 and 50 Hz.

7. Dynamic scale according to claim 1, wherein all drive wheels rotate in the same direction.

8. Dynamic scale according to claim 1, wherein digital filtering of interfering oscillations of the signals of the weighing cells takes place in the electrically connected measurement value processing units (VE1, VE2) of the weighing cells.

9. Dynamic scale according to claim 8, wherein a lowpass filter is used that attenuates frequencies above approximately 15 -20 Hz by at least 60 dB, and in that two digital notch filters attenuate an interfering oscillation and the first harmonic associated with this by at least 70 dB.

10. Dynamic scale according to claim 1, wherein the maximum transport velocity Vmax=700 mm/s.

11. Dynamic scale according to claim 1, wherein a first circuit board is installed at the first frame and a second circuit board and the electronic measurement value processing unit of the first weighing unit are installed at the second frame, and wherein the first ribbon cable runs between a first cable clip installed at the floor plate and the second circuit board, and the second ribbon cable runs between the circuit boards.

12. Dynamic scale according to claim 1, wherein the first and second weighing pans respectively have a guide wall and a transport belt.

13. Dynamic scale with two weighing units, wherein each weighing unit is equipped with at least one weighing pan installed on a frame and with a weighing cell that is arranged on a weighing bar, wherein the respective weighing pan is situated on an upper level and the weighing cell is arranged between the upper level and a lower level at a distance from the upper level in the direction of gravity, wherein the weighing cell of a second weighing unit is arranged functionally cascaded for weighing, relative to the weighing cell of a first weighing unit, in the direction of gravity, the second weighing unit being attached with its lower plane to a floor plate of the dynamic scale that is situated in an x/z reference plane of a coordinate system;

wherein a respective electronic measurement value processing unit is associated with the weighing cells;

with at least one sensor and with a transport device for a transport of a weighed good standing on edge in a transport direction z during the weighing in each weighing unit, wherein each transport device has a transport belt, a motor to drive the aforementioned transport device and an encoder;

with a transmission of the control signals from a joint control unit to the motors and with a transmission of the output signals of the electronic measurement value processing units of the first weighing cells to the inputs of the joint control unit; and a spring steel sheet is installed on a first shaft or a stationary axle of a deflection roller of the first transport belt running in the transport direction z of the weighed good, which spring steel sheet projects beyond the first shaft or the stationary axle by a length counter to the transport direction of the transport belt, wherein the spring steel sheet is fashioned as a slide plate on the length L and is bent with a part in the direction of gravity at the mail intake side.

14. Dynamic scale with two weighing units, wherein each weighing unit is equipped with at least one weighing pan installed on a frame and with a weighing cell that is arranged on a weighing bar, wherein the respective weighing pan is situated on an upper level and the weighing cell is arranged between the upper level and a lower level at a distance from the upper level in the direction of gravity, wherein the weighing cell of a second weighing unit is arranged functionally cascaded for weighing relative to the weighing cell of a first weighing unit, in the direction of gravity, the second weighing unit being attached with its lower plane to a floor plate of the dynamic scale that is situated in an x/z reference plane of a coordinate system;

wherein a respective electronic measurement value processing unit is associated with the weighing cells;

with at least one sensor and with a transport device for a transport of a weighed good standing on edge in a transport direction z during the weighing in each weighing unit, wherein each transport device has a transport belt, a motor to drive the aforementioned transport device and an encoder;

with a transmission of the control signals from a joint control unit to the motors and with a transmission of the output signals of the electronic measurement value processing units of the first weighing cells to the inputs of the joint control unit; and the transmission of the control signals to the first motor takes place via a first and second ribbon cable which has a thickness and a width, wherein the width is greater than the thickness, wherein the surfaces on the broad side of the ribbon cable are arranged parallel to the surfaces of the weighbars that are respectively provided with a weighing cell, and wherein both the transmission of the output-side control signals of the joint control unit to the second motor and the transmission of the output signals of the electronic measurement value processing unit of the first weighing cell to the inputs of the joint control unit take place via the first ribbon cable.

15. Dynamic scale with two weighing units, wherein each weighing unit is equipped with at least one weighing pan installed on a frame and with a weighing cell that is arranged on a weighing bar, wherein the respective weighing pan is situated on an upper level and the weighing cell is arranged between the upper level and a lower level at a distance from the upper level in the direction of gravity, wherein the weighing cell of a second weighing unit is arranged functionally cascaded for weighing, relative to the weighing cell of a first weighing unit, in the direction of gravity, the second weighing unit being attached with its lower plane to a floor plate of the dynamic scale that is situated in an x/z reference plane of a coordinate system;

wherein a respective electronic measurement value processing unit is associated with the weighing cells;

with at least one sensor and with a transport device for a transport of a good to be weighed standing on edge in a transport direction z during the weighing in each weighing unit, wherein each transport device has a transport belt, a motor to drive the aforementioned transport device and an encoder;

with a transmission of the control signals from a joint control unit to the motors and with a transmission of the output signals of the electronic measurement value processing units of the first weighing cells to the inputs of the joint control unit; and a) the two motors provided for the propulsion of the transport belts are of identical design and respectively have a motor shaft that is angled towards the floor plate in the x-direction, wherein the smallest distance of the motor shafts from the floor plate is smaller than or equal to the largest external diameter of the motors, b) the first weighing pan (is situated upstream in terms of) a flow of goods to be weighed and is installed on a first frame and a second weighing pan in the transport direction z is installed on a second frame, and on the back side of each frame a respective adapter is provided that is installed on the associated frame, wherein the second motor is arranged vertically with a tolerance of less than or equal to ±10 mm below the second adapter on the second frame; wherein the second frame rests on the one end of a support; wherein the other end of the support is installed at a load introduction point of the weighbar, c) the motors are arranged symmetrically relative to the load introduction point of the weighbar, with a tolerance of less than or equal to ±10 mm, and d) a gearbox installed on the frame has toothed belt wheels that run in the same direction as the motors via a gearing conversion, and the motor operates at a speed, below a maximum transport velocity Vmax—the parasitic oscillations affect a measurement value determined from the signals of the weighing cells only in a tolerance range of ±0.6 g.

* * * * *